United States Patent
Wabnegger et al.

(10) Patent No.: US 10,181,705 B2
(45) Date of Patent: *Jan. 15, 2019

(54) FLEXIBLE ELECTRICAL ISOLATION DEVICE

(71) Applicant: QUANTA ASSOCIATES, LP, Houston, TX (US)

(72) Inventors: David Karl Wabnegger, Langley (CA); Robert Wayne Palmer, Houston, TX (US); Jody Milton Greer, Houston, TX (US); Michael Howard Boudreau, Salmon Arm (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,691

(22) Filed: Jan. 25, 2018

(65) Prior Publication Data

US 2018/0152008 A1 May 31, 2018

Related U.S. Application Data

(63) Continuation of application No. 15/332,113, filed on Oct. 24, 2016, now Pat. No. 9,882,360, which is a continuation of application No. 14/664,724, filed on Mar. 20, 2015, now Pat. No. 9,478,952, which is a continuation-in-part of application No. 14/633,749, filed on Feb. 27, 2015.

(60) Provisional application No. 61/968,543, filed on Mar. 21, 2014.

(51) Int. Cl.
*H01R 4/00* (2006.01)
*H02G 1/04* (2006.01)
*H02G 7/20* (2006.01)

(52) U.S. Cl.
CPC ............. *H02G 1/04* (2013.01); *H02G 7/20* (2013.01); *Y10T 29/49117* (2015.01)

(58) Field of Classification Search
CPC ................................. H01B 17/00; H01R 4/66
USPC ...... 174/5, 20, 31.5, 40 R, 42, 45 R, 45 TD, 174/74 R
See application file for complete search history.

(56) References Cited

U.S. PATENT DOCUMENTS 3,226,470 A * 12/1965 Bryant ............... H02G 7/056
174/79
3,300,570 A * 1/1967 Spiece ............... H01B 17/28
174/18

(Continued)

*Primary Examiner* — William H Mayo, III
(74) *Attorney, Agent, or Firm* — Mark A. Oathout; Oathout Law Firm; Antony C. Edwards

(57) ABSTRACT

An electrical isolator includes a flexible non-electrically conductive membrane and an inelastic flexible dielectric member journalled in the membrane and extending from the first end of the membrane to the second end of the membrane. First and second coupling members are anchored to the ends of the dielectric member. The ends of the membrane are mated in sealed engagement with the coupling members so that the coupling members fluidically seal the ends of the membrane and fluidically seal the dielectric member within the membrane. The membrane is filled with a dielectric fluid so as to displace any air in the membrane and the dielectric member. The coupling members are adapted to couple to objects at opposite ends of the electrical isolator.

30 Claims, 7 Drawing Sheets

(56) References Cited

U.S. PATENT DOCUMENTS

| | | | | |
|---|---|---|---|---|
| 3,721,002 A | * | 3/1973 | Pugh | H02G 15/22 |
| | | | | 174/10 |
| 4,337,923 A | * | 7/1982 | Smith | F16G 11/06 |
| | | | | 174/79 |
| 4,432,663 A | * | 2/1984 | Lasak | F16G 11/05 |
| | | | | 174/79 |
| 4,460,159 A | * | 7/1984 | Charlebois | G02B 6/4465 |
| | | | | 24/129 W |
| 5,765,834 A | * | 6/1998 | Engli | E21B 33/136 |
| | | | | 277/322 |

\* cited by examiner

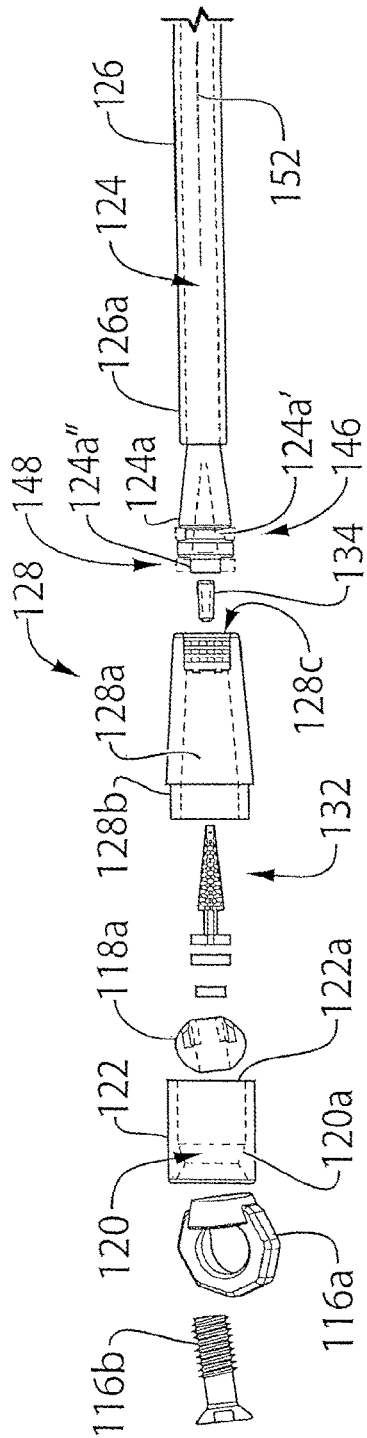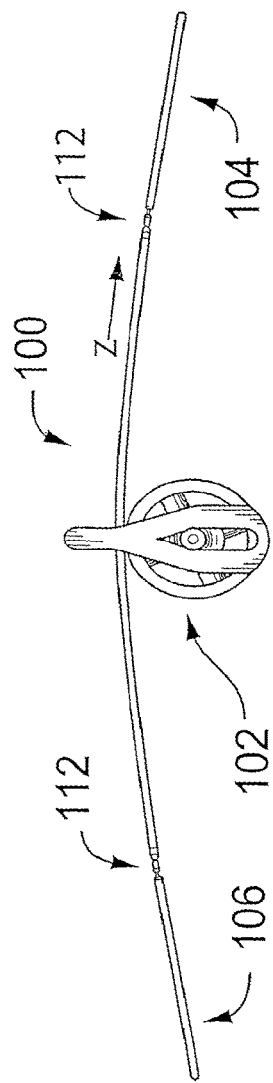

FLEXIBLE ELECTRICAL ISOLATION DEVICE

CROSS REFERENCE TO RELATED APPLICATIONS

This application is a continuation of U.S. patent application Ser. No. 15/332,113, filed on Oct. 24, 2016 which in turn is a continuation of U.S. patent application Ser. No. 14/664,724, filed on Mar. 20, 2015. U.S. patent application Ser. No. 14/664,724 is a continuation-in-part of U.S. Ser. No. 14/633,749, filed on Feb. 27, 2015 which claims benefit of U.S. Patent Application No. 61/968,543 filed on Mar. 21, 2014. Entireties of all the patent applications stated in this paragraph are incorporated herein by reference.

TECHNICAL FIELD

This disclosure generally relates to a flexible electrical isolation device, one example of which is for use in replacing energized power lines or in stringing replacement optical ground wire or static wire above energized power lines.

BACKGROUND

There are many examples, some of which are provided herein, where the applicant believes it to be beneficial to provide a tensile load bearing, electrically insulating, flexible isolation member which is weather resistant and which advantageously may also provide for rotation in the form of swivelling or other relative motion along the length of the flexible member so as to relieve torsional loads and/or shearing loads. One example, already mentioned, is for use in replacing, or what applicant refers to as reconductoring or restringing of power line conductors or static wires respectively. Other examples may include the use of the flexible isolation member in a sling line under a helicopter, for example when used to suspend a lineman from the helicopter for power line maintenance work.

As will be commonly known, overhead power lines use one or more phases of conductors to transmit electricity within a transmission grid. The overhead power lines may be used for bulk transmission from a power plant to centers of high demand and for distribution within the centers of high demand. The conductors are often supported above the ground by support structures. Over time the energized transmission lines, referred to herein as energized conductors, may be exposed to harsh weather conditions, or become overloaded. Deteriorated or overloaded conductors must be replaced in that general process previously referred to as reconductoring. Static wires may be strung above the conductors to shield the energized conductors from lightning strikes. Occasionally the static wires, which may be conventional static wires or otherwise may be referred to as overhead ground wire, shield wire, earth wire, etc., or which may be optical ground wire (OPGW), collectively referred to herein as static wire, must also be replaced in a process referred to as restringing. During the reconductoring or restringing process it is often advantageous to use pulling wire instead of pulling rope which may melt, break or otherwise fail if moist or dirty when exposed to a high voltage environment. A high voltage environment occurs when pulling conductors or static wire because each may be subjected to a significant induced voltage due to proximity to one or more high voltage energized conductors, for example carrying 69 kV or more. Thus it is useful to use a pulling wire instead of a pulling rope. The use of pulling wire necessitates the use of a flexible electrically isolating link between the pulling wire and the conductor or static wire that is to be replaced.

SUMMARY

The present invention thus includes or comprises, as those terms are used interchangeably herein, a flexible, insulated, isolation link, member or device, again as those terms are used interchangeably herein, to separate and electrically isolate, in one example the old, to-be-replaced, existing conductor or static wire from the pulling wire or wire rope, so as to eliminate the circulating current between the old conductor or static wire and the wire rope.

The present disclosure may be summarized, in one aspect, as an electrical isolator which includes:
  a. a flexible non-electrically conductive membrane, such as a tube, having first and second opposite ends;
  b. an inelastic flexible dielectric member having first and second opposite ends, the dielectric member journalled in the membrane and extending from the first end of the membrane to said second end of said membrane;
  c. first and second coupling members anchored, respectively, to the first and second ends of the dielectric member, the first and second ends of the membrane mated in sealed engagement with the first and second coupling members so that the first and second coupling members fluidically seal, that is, provide a fluid tight or leak-proof seal around the first and second ends of the membrane and fluidically seal, that is, provide a fluid tight or leak-proof seal sealing the dielectric member within the membrane;
  d. the membrane filled with a dielectric fluid so as to displace any air in the membrane and the dielectric member;
  e. the first and second coupling members adapted to couple to objects at opposite ends of the electrical isolator.

In one example, the first and second coupling members includes an anchor element and wherein one anchor element is inserted into each of the first and second ends of the dielectric member so as to anchor therein the coupling members.

The anchor elements may include at least one spelter. Each a coupling member may include at least one female spelter coupling mated with a spelter.

The anchor element may include an elongate shaft member which is inserted into and aligned along the length of a corresponding end of the dielectric member when the coupling members are mounted to the ends of the dielectric member.

The at least one spelter may include first and second spelters joined end-to-end, or mounted on a shaft member extending between the spelters, or otherwise located near or adjacent to one another when mounted in the ends of the dielectric member.

In the embodiment where the spelters are mounted on a shaft member, the shaft member has opposite first and second ends, and the first spelter is mounted on the first end. The female spelter coupling mates onto the first spelter. The shaft member is inserted into the corresponding end of the dielectric member so that the second end of the shaft member is inserted first into the end of the dielectric member and so that the first end of the shaft member is, once inserted into the dielectric member, adjacent a terminal end face of the corresponding end of the dielectric member so that the corresponding end of the dielectric member is sandwiched between the first spelter and the female spelter coupling to clamp the corresponding end of the dielectric therebetween. The second spelter may be mounted or formed on the second end of the shaft member.

The female spelter coupling may include a female mating collar extending therefrom. The collar is sized to snugly fit around the membrane. The collar may be positioned relative to the second spelter when the first spelter is the mated in the female spelter coupling so that the female mating collar surrounds the second spelter, wherein the dielectric member is sandwiched between the second spelter and the female mating collar and a seal is formed between the membrane and the female mating collar.

The dielectric member may advantageously be a dielectric synthetic rope, for example, made from strands chosen from the group comprising: aramid, polyester, polyethylene, nylon™, to name examples which are not intended to be limiting, or hybrids thereof, collectively referred to herein as synthetic rope.

The female spelter coupling has a cavity. The first spelter mates within the cavity. The cavity may be filled with a fluid-to-solid setting compound so as to fix the first spelter within the cavity. The setting compound may be a two part resin.

The membrane may be at least partly translucent so that the condition of the fluid therein may be inspected from the exterior of the membrane. The membrane may be a reinforced tube. The fluid may be oil, for example having a viscosity of substantially 0.5 centi-stokes.

A pressure equalizing tube may be nested within the membrane or tube and extending substantially from the first end to the second end of the membrane or tube so as to provide fluid communication of the fluid between the first and second ends of the membrane or tube. The dielectric member may have a core. The pressure equalizing tube may run along the core. The dielectric member may advantageously substantially fill the membrane or tube.

The electrical isolator may be an isolation link electrically isolating power line conductor or static wire from a pulling line. A method is provided that couples the isolator between the conductor or static wire and the pulling line. The method and apparatus also applies to other applications such as helicopter sling lines, etc.

BRIEF DESCRIPTION OF DRAWINGS

Various examples of the apparatus are described in detail below, with reference to the accompanying drawings. The drawings may not be to scale and some features or elements of the depicted examples may purposely be embellished, or portions removed, for clarity. Similar reference numbers within the drawings refer to similar or identical elements. The drawings are provided only as examples and, therefore, the drawings should be considered illustrative of the present invention and its various aspects, embodiments and options. The drawings should not be considered limiting or restrictive as to the scope of the invention.

FIG. 2 is a partially exploded view of the portion of the isolation link of FIG. 1.

FIG. 3 is a side elevation view showing an isolation link passing through a dolly during pulling.

DETAILED DESCRIPTION

Figure 1:
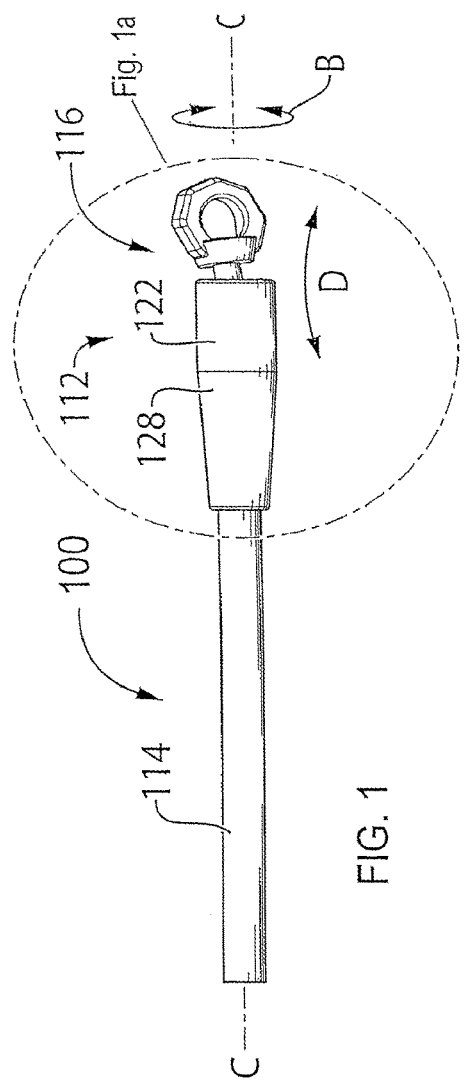
FIG. 1 is a side elevation view of one end of an example of a flexible, electrically insulated, isolation link.

Isolation link 100 is a flexible, weather resistant and preferably weather-proof, electrical insulator having the properties that it not only does not conduct electric current, through its length, but also will carry a tensile loading and also preferably allow for swivelling, rotation, or other relative movement along the link of at least one portion of the link relative to another to relieve torque loading on or at the end of the link due to any torque applied to the link from for example a pulling wire or a pulling rope. For example, the isolation link 100 may be a length of tensile and dielectrically tested insulated rope with dielectric properties, preferably protected or shielded from the weather or other adverse elements that may compromise its dielectric properties. The protection or shielding preferably will protect the entire length of insulated rope. Although during reconductoring or restringing a pulling rope may be employed in good weather instead of a pulling wire, it is in applicant's opinion prudent to use an isolation link in those situations also, in case of inadvertent deterioration of the rope's dielectric properties due to moisture, contamination, etc. Applicant has found that high voltage levels in the energized conductors, which have been found to induce a voltage and current in non-energized conductors or static wires, when combined with the adverse effect on the dielectric properties of a pulling rope due to moisture and/or dirt, etc. in or on the pulling rope, may cause the pulling rope to melt and break or otherwise fail. The isolation link 100 electrically isolates between a pulling wire and the associated workers and the stringing equipment and the to-be-replaced conductor or static wire 20 as the pulling wire is strung through the power line system One example of an isolation link 100 proposed by the applicant uses a length of dielectric rope which is encased in a flexible, dielectric membrane. The membrane is filled with dielectric oil or other inert dielectric fluid, such as a dielectric liquid or gel, so as to soak, completely bath or surround, or impregnate the dielectric rope and exclude air in the interstices between the fibres of the dielectric rope and in any voids between the rope and the flexible, dielectric membrane. In one embodiment, each end of the isolation link, its length depending on the required electrical insulation as would be known to one skilled in the art, is sealed to maintain the oil or other dielectric in the membrane and in the rope. The ends are mounted in a terminating device to a joint such as a ball joint and/or swivel joint, etc., so as to relieve a torsional force applied to the link and allow relative motion between the end of the sealed membrane/rope combination and for example the end of the pulling wire, or end of the conductor or static wire, or end of the sling rope, as the case may be. A description of the isolation link is provided in applicant's U.S. provisional patent application No. 61/968,543, entitled Flexible Isolation Device for Wire Stringing, filed Mar. 21, 2014, and in applicant's U.S. patent application Ser. No. 14/633,749 entitled Stringing Procedure to Replace Existing Static Line with OPGW, which are included herein in their entirety by reference, and to which this application claims priority in part.

One skilled in the art will appreciate that the isolation link 100 provides an electrically insulated connection between the old conductor or static wire (to be replaced) and the pulling wire that breaks an electrical circuit, such as a ground circulating current, that can circulate through the earth and along the old conductor static wire and pulling wire. Typical lengths for isolation link 100 may be 1-2 feet for low voltage reconductoring (e.g. less than 25 kV), or in the order of 8-20 feet for high voltage transmission reconductoring (e.g. greater than 345 kV), 50-250 feet for slinging a lineman under a helicopter.

In the instance of a replacement wire being pulled into an occupied wire position, the existing wire in the occupied wire position is utilized as a pulling line by positioning it in dollies or travelers, connecting it to the new wire and pulling the existing wire utilizing for example a v-groove or bull-wheel puller. All pulling and tensioning equipment and conductor materials are situated upon equal potential zones (EPZ's) at each end of the pull. A running ground is placed upon the pulling line at the wire puller end and another running ground is placed on the new wire at the tensioning end (payout). Close proximity stringing is executed in the same manner, with the exception that the circuit, static, or OPGW (collectively herein static wire) being replaced is de-energized, but is co-located with an energized circuit.

Although the wire being installed is not directly energized, such as by a utility company in the normal course of supplying electricity, the close proximity of the energized phases creates an energized environment which imparts an induced voltage and current onto the pulling line and on the new wire. The running grounds are used in order to protect the equipment and the workers who are required to be in close proximity to the wires. However, multiple ground potential points combined with the induced voltage and current create a ground circulating current with unknown and unpredictable electrical forces. A single point ground will greatly reduce this effect, but would leave one end of the entire pull operation, or simply the pull unprotected.

As stated above, use of di-electric tested rope installed between the pulling line and the new wire can be used to isolate the grounds, however the rope itself poses a safety hazard due to the potential for the rope to become contaminated by airborne particles, high humidity, or precipitation rendering the rope conductive thereby eliminating the isolation between the pulling line and the new wire required.

The isolating insulator link or isolation link 100 may be characterized in one aspect as including a flexible elongated tensionally-strong insulator such as a membrane-encased dielectric flexible member having terminating couplings mounted at either end. The couplings provide for relative torsion relief and relative bending moment relief between, respectively, for example the pulling line at one end of the isolation link and the new wire at the other end of the isolation link. In one embodiment the couplings at either end of the elongated isolating insulator link each include a first joint allowing relative bi-directional movement between two portions, for example two halves, of the coupling. A second joint may be provided allowing relative rotation or swivelling about a longitudinal axis of the coupling.

The first joint may for example be a universal joint, or a ball joint, or a tensionally strong flexible stem encased within the coupling. The second joint may for example be a swivel. A single joint may be provided to replace the function of both the first and second joints.

As stated above, one example of the flexible member in isolation link 100 proposed by the applicant uses a length of dielectric rope which is encased in a flexible membrane, hose or tube (collectively herein a flexible membrane), wherein the flexible membrane is filled with dielectric oil so as to impregnate the dielectric rope and exclude air in the interstices between the fibres of the rope and in any voids between the rope and the walls of the membrane. In one embodiment, each end of the isolation link, its length depending on the required insulation between the pulling wire and the conductor or static wire as would be known to one skilled in the art, is sealed to maintain the oil in the membrane and rope, and mounted in a terminating device to a joint or joints such as described above so as to resist a tensile force applied to the isolation link and allow relative motion between the end of the flexible member and the end of the pulling wire or end of the static wire as the case may be.

Thus, as will now be understood, elimination of the circulating current while providing electrical protection on both ends of the pull may be accomplished by electrically isolating the pulling line or pulling wire from the new wire using such an isolating link. This allows the installation of running grounds on both ends of the pull without creating a circulating current.

The flexible member is flexible or bendable or otherwise non-resiliently deformable while resisting lengthening due to tensile loading (herein collectively referred to as flexible) to accommodate for example the bending radius of a traveler or dolly (as those terms are used interchangeably herein) and in one basic example is composed of a flexible high tensile strength, di-electric material with attachment joints or couplings on each end. The attachment joints or couplings of the isolating link, mounted at either end of the flexible member, are constructed in such a manner as to, in a preferred embodiment not intended to be limiting, control both rotation imparted by the cables and bi-directional shear induced when the connection or attachment points pass through the dollies. The isolating link, when properly maintained, is advantageously impervious to moisture, dirt, and airborne particles including dust, thereby mitigating the potential for the device, and in particular the flexible member becoming conductive during use. A reinforced composite polymer or aramid, or combination of those or other synthetic rope fibres, for example in the form of a composite braided rope are examples of flexible material which may be used in the flexible member. The flexible membrane encasing the flexible member may for example be clear or transparent for ease of inspection for the presence of air in the tube or for the state of the rope, or may be partly clear (for example if the membrane is a tube having an inspection window strip along its length) or translucent. The tube may also for example be reinforced as for example found in conventional insulated hydraulic hoses.

Thus as seen by way of example in FIGS. 1-4, isolation link 100 includes attachment couplings 112 at either end of a length of a flexible member such as flexible dielectric insulator 114. The couplings themselves are not, at least need not be, constructed of dielectric material and may for example be made of stainless steel. The elongate dielectric flexible insulator 114 is of sufficient length to provide electrical isolation for the rated system voltage to which dielectric flexible insulator 114 will be exposed without the need for the connection joints or couplings 112 to be di-electric. In the instance, without intending to be limiting, of the isolation link 100 being used in a wire replacement procedure, couplings 112 attach the flexible insulator 114 to the pulling wire 104 at a first coupling 112, and to the new wire 106 at a second coupling 112, where the first and second couplings 112 are at opposite ends of isolation link 100.

Figure 1A:
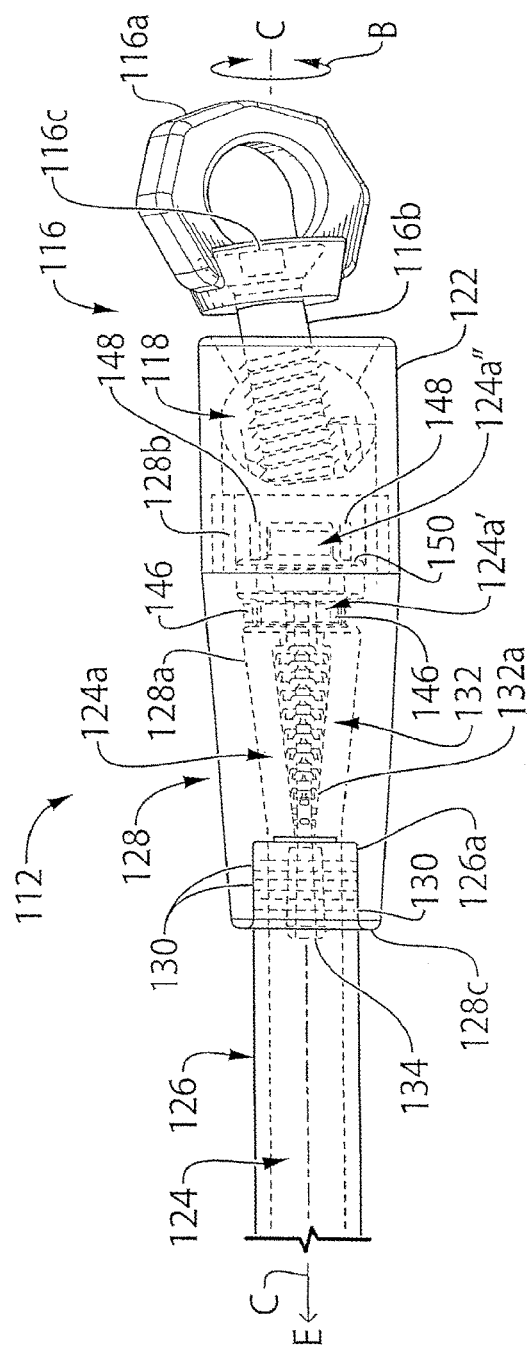
FIG. 1A is an enlarged, partially cutaway, view of a portion of FIG. 1.

One of the couplings 112 is seen enlarged in FIG. 1A. One of the couplings 112 is seen in partially exploded view in FIG. 2. Although not intending to be limiting, in those embodiments, torsion resulting in relative rotation in direction B about longitudinal axis C between flexible insulator 114 and any line attached thereto, or any wire attached thereto such as either the pulling wire 104 or the new conductor or static wire 106, is relieved by a swivel joint within bi-directional joint 116. Swivel couplings which may be employed are known to those skilled in the art but may for example include eye 116a rotatably mounted onto the end of shank 116b by means of swivel mount 116c. Swivel couplings may for example also be those of the type, such as the LH104™ swivel, sold by Morpac Industries™ of Pacific, Wash., USA, as generally represented in FIGS. 5-8. As would be known to one skilled in the art, such swivel couplings may employ internal bearings, preferably sealed or somewhat sealed to inhibit the intrusion or effect of harsh environmental elements or factors such as moisture, grit, cold/heat, etc. Although not shown it is understood that the use of swivels would advantageously also include the use of such bearings so that swivelling rotation in direction B is not left solely to rotation in direction B of ball 118a within its socket.

Bi-directional joint 116 is bi-directional in the sense that it allows for both rotation in direction B about axis C, but also rotation in direction D, the latter provided for example by ball joint 118 in joint 116 so as to accommodate the relative bi-directional movement caused by shear and bending as the coupling 112 passes, as for example in direction Z, through and over a dolly 102 as seen in FIG. 3. In the illustrated example, ball 118a is threadably mounted onto shank 116b. Ball 118a is mounted for rotation within ball socket 120 formed within socket housing 122. In particular, ball 118a rests against shoulder 120a in socket 120. Bi-directional joint 116 may be of various designs as would be known to one skilled in the art. For example, and without intending to be limiting, bi-directional joint 116 may be a form of universal joint, or such as the illustrated ball-joint and swivel combination, or may include an encased narrow, flexible stem (not shown) having sufficient tensile strength and which coupling joins one part of coupling 112 to the other part of coupling 112.

As described above, flexible member 114 in one embodiment includes a synthetic rope encased in a tube and mounted at each end thereof to a corresponding coupling 112. Thus as seen in FIGS. 1A and 2, rope 124 is snugly shrouded in flexible tubing 126. Tubing 126 is shorter than the length of the end of the rope 124 so as to expose the end 124a from the end of the tube. Spelter socket 128 is hollow along axis C and provides a frusto-conical wedging cavity 128a between the threaded male end 128b and the oppositely disposed female end 128c. Male end 128b threadably engages with the threaded female end 122a of socket housing 122. Female end 128c engages with the end 126a of tube 126. In this embodiment, which is not intended to be limiting, a tension load on flexible member 114 in direction E, i.e., along axis C, is to be taken up by rope 124 acting on spelter socket 128, and not to an appreciable degree by tube 126. Tubing 126 may be mounted into spelter socket 128, and specifically into female end 128c, in a snug friction fit sealed by seals 130. Seals 130 may for example be o-rings or such other seals as would be known to one skilled in the art, to create and maintain a fluidic seal between end 126a of tubing 126 and the interior annular surface of female end 128c.

Figure 4:
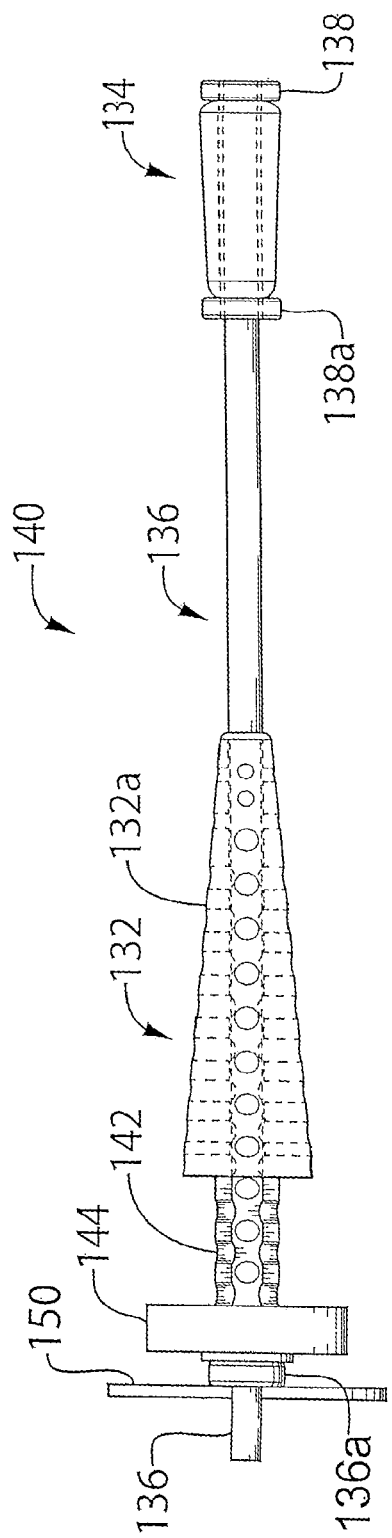
FIG. 4 is an assembled spelter lock as shown used in the spelter socket in the coupling of FIG. 1A.
Figure 5:
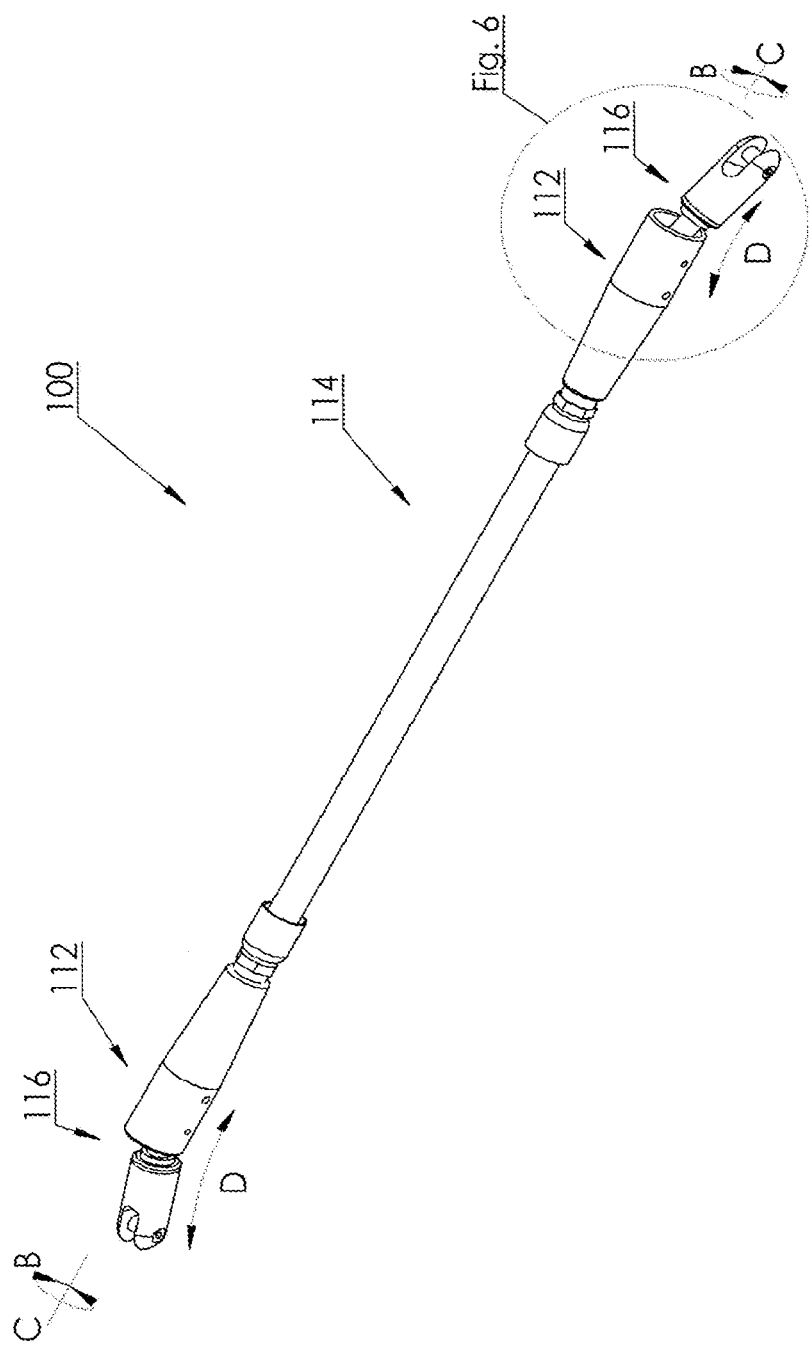
FIG. 5 is, in perspective view, an alternative embodiment of an isolation link according to a further aspect of the invention.
Figure 6:
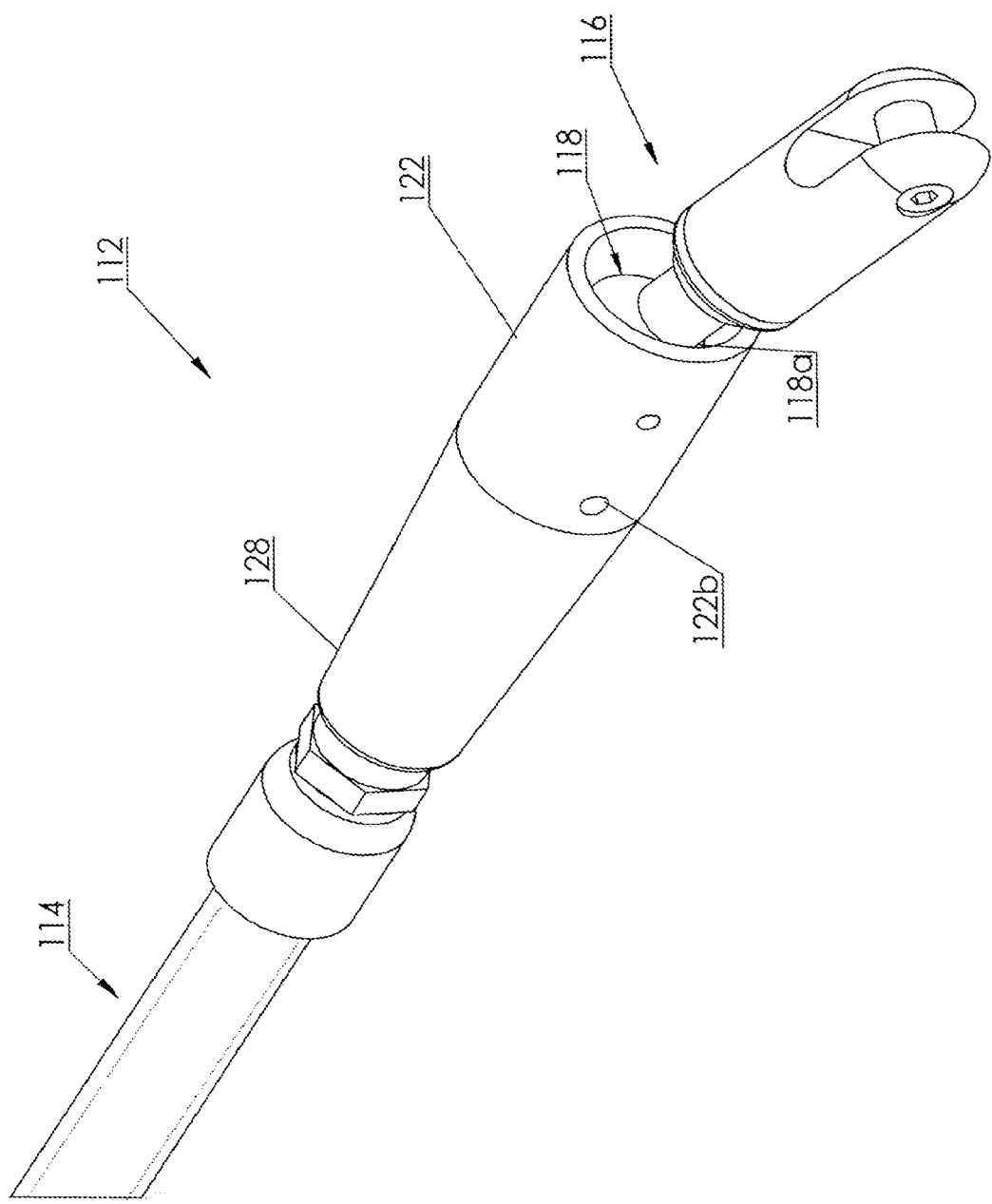
FIG. 6 is an enlarged view of a portion of FIG. 5.
Figure 7:
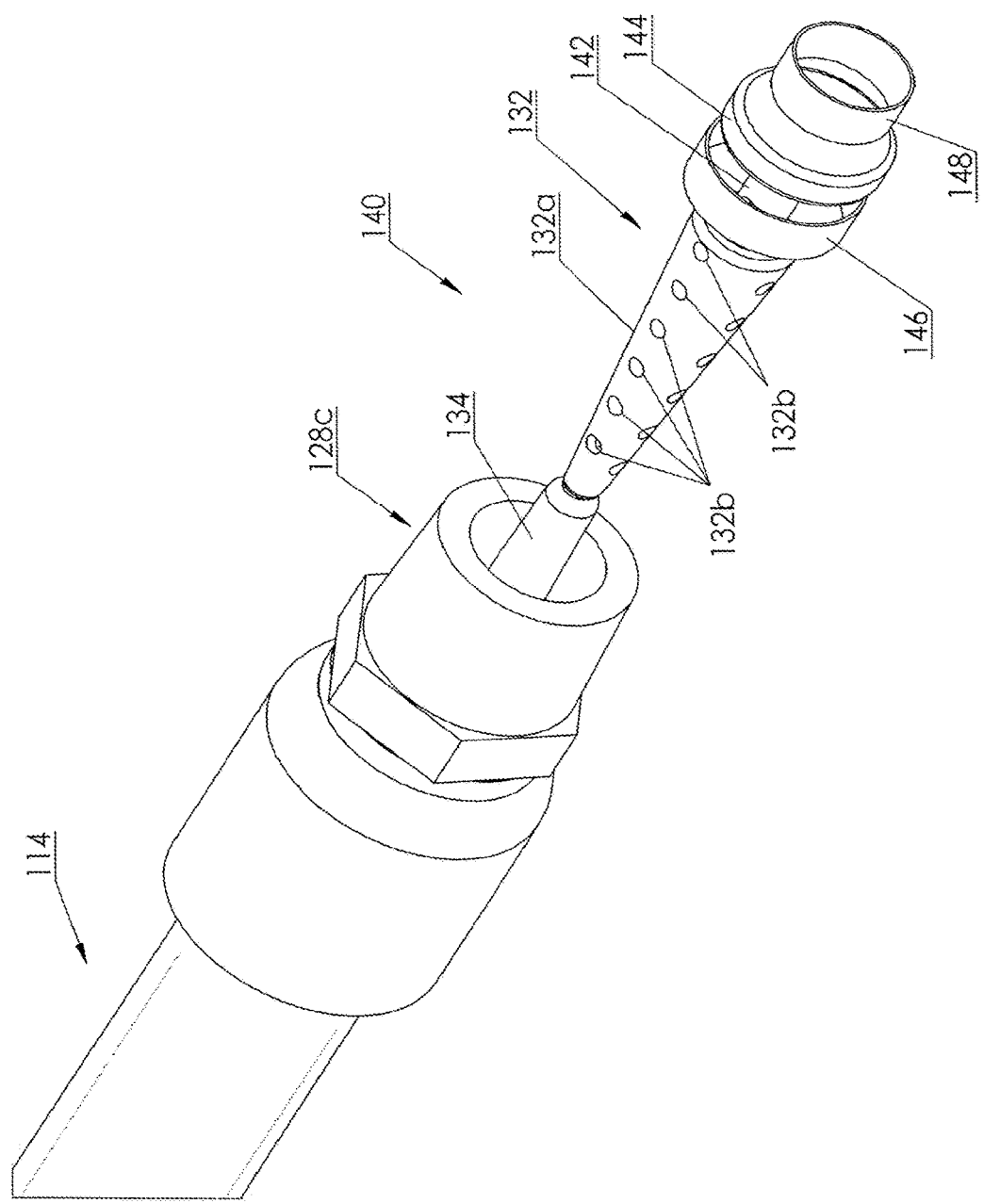
FIG. 7 is an enlarged, partially cut-away view of FIG. 6 showing the swivel, ball joint and part of the spelter coupling removed.
Figure 8:
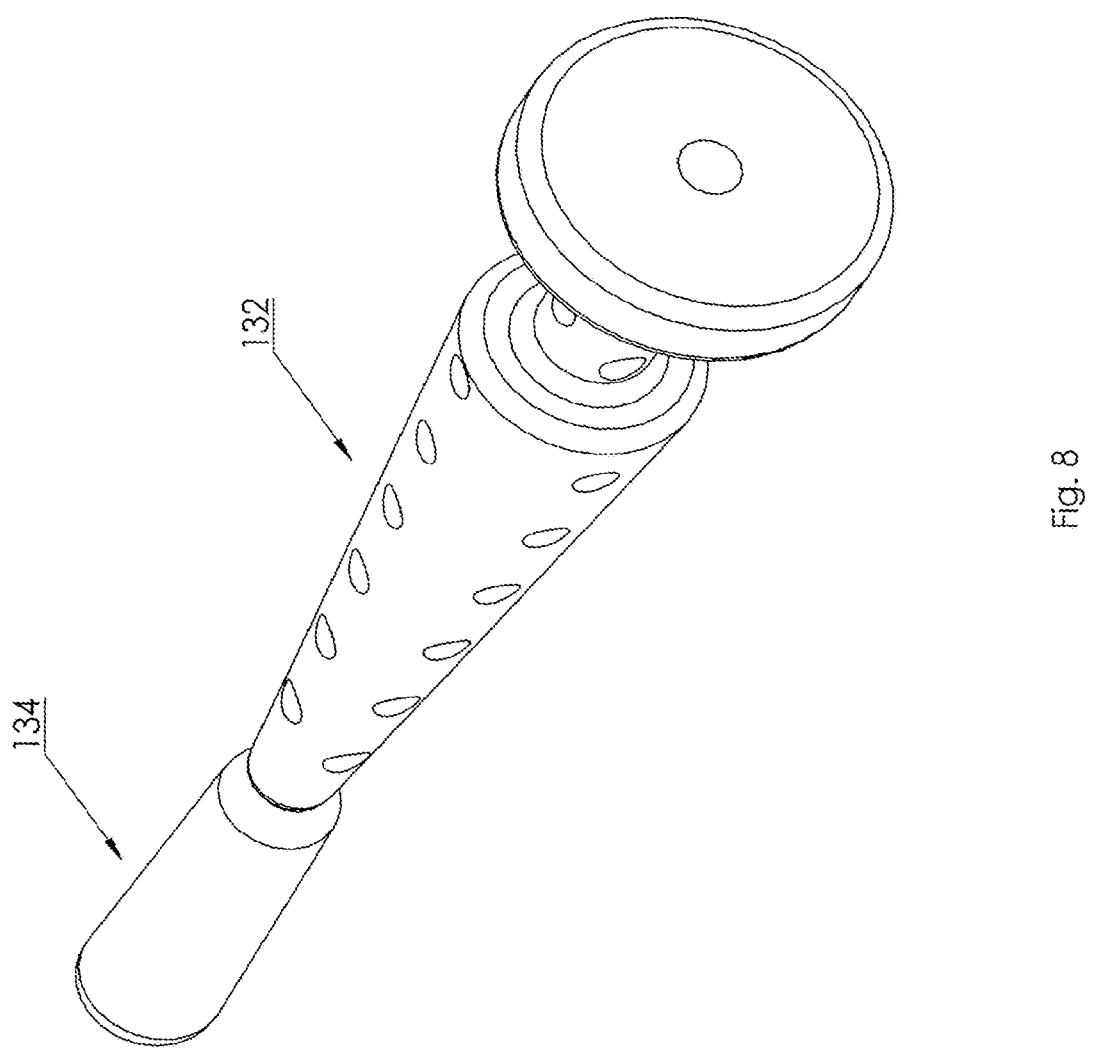
FIG. 8 is a view of the primary and secondary spelters of FIG. 7.

The end 124a of rope 124 is flared radially outwardly relative to axis C as a result of, and so as to accommodate, the insertion of a conical first or primary spelter plug 132 best seen in FIGS. 4 and 8, along the core of the rope 124. The primary spelter plug 132 is provided to assist in anchoring the end 124a of rope 124 into the spelter socket 128. The spelter plugs are also referred to herein as spelters. In the illustrated embodiment, which is not intended to be limiting, a second or secondary spelter plug 134, which may have a small reverse taper relative to the taper on the primary spelter plug, is also provided to also assist in anchoring the end 124a of rope 124 into the spelter socket 128 and to assist in maintaining the seating of the seals 130 when the rope is under tensile loading. Spelter plug 134 may be rigidly mounted to or otherwise near or adjacent spelter plug 132. The mounting may be for example by means of a rod 136, seen in FIG. 4, although it is to be understood that the use of such a rod is not required. The ends of rod 136 may be threaded, and the spelter plugs 132, 134 hollow so as to accommodate rod 136 journalled through the lengths of the spelter plugs and the spelter plugs anchored onto the rod by nuts 138. A positioning nut 138a may be used to hold spelter plug 134 in a desired position along rod 136.

Primary spelter plug 132 has a tapered or conically wedge-shaped surface 132a which is sized so as to evenly sandwich, i.e., to substantially evenly distribute a pressure loading to, end 124a of rope 124 between the surface of cavity 128a and the surface 132a of primary spelter plug 132 when tension is applied to rope 124 in direction E. The taper of plug 132 is inclined relative to axis C at, for example, the same angle relative to axis C as the surface of frusto-conical cavity 128b in spelter socket 128, although this is not intended to be limiting. Secondary spelter plug 134 is advantageously positioned along rod 136 so that once spelter lock 140 (in this embodiment spelters 132, 134 and rod 136) is pushed into and along the centroidal core of the end 124a of rope 124, and the spelter lock 140 and the end of rope 124 slid into the spelter socket 128, not only is the end 124a of the rope 124 flared over the primary spelter 132, but the portion of the rope covering the secondary spelter 134 is radially outwardly compressed. Thus, just as the primary spelter compresses the end of the rope 124 against the frusto-conical cavity 128a, the secondary spelter compresses against the interior surface of female end 128c (herein also referred to as a female mating collar of the spelter socket or coupling) the portion of the rope 124 and tube 126 sandwiched between the secondary spelter 134 and the interior surface of female end 128c of spelter socket 128. This radially outward compression of the rope and tube in the female mating collar, end 128c, of the spelter socket may assist in holding the fluidic sealing of seals 130 when rope 124 in under tension in direction E and when thus the rope may be of reduced diameter. Such a radially outward compression also may increase the frictional engagement of the secondary spelter in the rope 124 to assist in holding the rope in the spelter socket 128. The secondary spelter 134 may, in alternative embodiments, be replaced with a hydraulic hose fitting threaded or otherwise incorporated into end 128c of spelter socket 128.

The spelter lock 140 also may include a neck 142 and an annular locking flange 144. Neck 142 is of reduced radial diameter relative to the radial diameters of the widest end of primary spelter 132 and relative to the diameter of locking flange 144. The length of neck 142 is such that a first di-electric clamp 146 (shown in dotted outline in FIG. 2), such as a di-electric hose clamp (one example of which being a plastic strap), may be used to pinch or compress a corresponding annular portion 124a' of end 124a of rope 124 into the annular channel formed around neck 142 between primary spelter 132 and locking flange 144. This locks the end of the rope onto the spelter lock 140. A second di-electric clamp 148 (also shown in dotted outline) may be used to further lock a second rope portion 124a" of the rope end 124a onto the spelter lock by clamping the rope portion 124a" down onto the end of the rod 136 on the opposite side of locking flange 144 from neck 142.

In embodiments employing a rod 136, because rod 136 may be metallic, as may be the primary and/or secondary spelters 132,134, and indeed all of spelter lock 140, an electrically conductive connection should be provided, such as a spider or star washer 150 seen in FIG. 4, between rod 136 and the interior surface of spelter socket 128 adjacent surface 128a. Spider or star washer 150 may be separated from locking flange 144 by washer or spacer 136a. One or more set screws 122b may advantageously be provided, acting for example between housing 122 and the male end 128b of spelter socket 128, to resist inadvertent unscrewing of the housing 122 from the spelter socket 128.

A dielectric fluid, for example a dielectric fluid such as oil (e.g., viscosity of about 0.5 centi-Stoke) or a viscous inert fluid or gel such as fluidic silicone, or other dielectric fluids as would be known to one skilled in the art, is impregnated into rope 124 and filled into the interstices between rope 124 and tube 126 so as not to leave any air bubbles or air pockets. The dielectric fluid fills the tube and completely impregnates between the fibres of the rope along the entire length of the rope and tube extending between and into the couplings 112. To stop the dielectric fluid from escaping from within cavity 128a and past the clamps 146, 148, which themselves will act as seals inhibiting the movement of the dielectric fluid along the rope fibres so as to leak into the cavity of housing 122, a further seal (not shown) may be provided. One example of such a further seal, and without intending to be limiting, is to fill the cavity in the spelter socket with epoxy resin while the resin is in its fluid state, and let the epoxy harden while completely filling any voids in the spelter socket cavity and for example anchoring the spelter 132 by the incursion of the resin into the spelter via apertures 132b.

In one embodiment, hollow flexible spinal member 152 seen in dotted outline in FIG. 2, which may be a narrow diameter flexible tube, is inserted along the length of the core of rope 124. The function of the spinal member 152 is to recirculate the dielectric fluid from one end of the flexible member 114 to the other end of flexible member 114 when the dielectric fluid becomes pressurized at one end as for example when the link 100 passes over a dolly 102.

While the above disclosure describes certain examples of the present invention, various modifications to the described examples will also be apparent to those skilled in the art. The scope of the claims should not be limited by the examples provided above; rather, the scope of the claims should be given the broadest interpretation that is consistent with the disclosure as a whole.

What is claimed is:
1. An electrical isolation link comprising:
an electrically insulating rope encased in the hollow cavity of a flexible dielectric fluid-impermeable weather shielding covering the rope so as to extend along substantially an entire length of the rope between the opposite ends of the rope,
a dielectric fluid also encased within the weather shielding, wherein air in interstices between fibers of the rope, air bubbles, air pockets, and air in voids between the rope and the weather shielding are excluded by the presence of the dielectric fluid in the hollow cavity and impregnation of the dielectric fluid into the rope,
and wherein the opposite ends of the rope, and corresponding opposite ends of the weather shielding are sealed to form opposite fluidically sealed ends, and wherein each of the sealed ends are mounted to terminating couplings, wherein the rope is mounted to the couplings to take-up substantially an entire tensile load applied to the couplings.

2. The link of claim 1 wherein the terminating couplings further each include at least one joint.

3. The link of claim 2 wherein the at least one joint provides for bending of the terminating couplings.

4. The link of claim 2 wherein the at least one joint provides for swiveling rotation of the terminating couplings.

5. The link of claim 1 wherein the weather shield includes a clear membrane to provide for inspection by a user into the hollow cavity.

6. The link of claim 5 wherein the clear membrane is a window strip.

7. The link of claim 1 adapted for use between a pulling line and a replacement conductor.

8. The link of claim 1 adapted for use between a to-be-replaced conductor and a new replacement conductor.

9. The link of claim 1 adapted for use between an aerial vehicle and a slung load, under-slung beneath the aerial vehicle.

10. The link of claim 9 wherein the aerial vehicle is a helicopter and the slung load is a lineman.

11. The link of claim 1 wherein the rope fibers are chosen from the group consisting of: polymer, aramid, composite, synthetic.

12. The link of claim 10 wherein the weather shielding is tubing.

13. The link of claim 12 wherein the length of the tubing is less than the length of the rope so that the opposite ends of the rope protrude from the opposite ends of the tubing so as to cooperate with the terminating couplings.

14. The link of claim 13 wherein the couplings each include a coupling cavity and wherein the opposite ends of the rope extend into the coupling cavity and are mounted therein to the corresponding terminating coupling.

15. The link of claim 14 wherein the coupling cavity is a socket and wherein each of the ends of the rope are flared within their corresponding socket so as to substantially fill the socket and secured therein by a fluid-to-solid setting compound.

16. The link of claim 1 wherein the weather shield includes a hollow flexible spinal member therein.

17. The link of claim 1 wherein the dielectric fluid has been allowed to soak into the rope to exclude the air, air bubbles and air pockets.

18. An electrical isolator comprising:
an elongate flexible dielectric member encased in a corresponding length of flexible dielectric tubing adapted to be filled with dielectric fluid,
wherein the opposite ends of the tubing and member are sealable to provide a fluid seal.

19. The isolator of claim 18 wherein the opposite ends are sealable by couplers and wherein the member and the tubing at either end are mounted to their corresponding coupler wherein the member is mounted to the couplers to take-up substantially an entire tensile load applied to the opposite ends.

20. The isolator of claim 19 wherein the tubing is filled with the dielectric fluid.

21. The isolator of claim 20 wherein air is substantially completely displaced by the dielectric fluid.

22. An apparatus comprising:
a dielectric elongate flexible membrane defining a hollow cavity, a first end, and a second end, wherein the hollow cavity is accessible from each of the first end and the second end of the flexible membrane; and
a first coupling located at the first end of the flexible membrane, and a second coupling located at the second end of the flexible membrane, wherein an interface between the flexible membrane at the first end of the flexible membrane and the first coupling, and the second end of the flexible membrane and the second coupling, are both fluidly sealed.

23. The apparatus according to claim 22, further comprising:
a dielectric rope located within the hollow cavity.

24. The apparatus according to claim 22, further comprising:
a dielectric fluid located within the hollow cavity.

25. The apparatus according to claim 22, further comprising:
a dielectric rope located within the hollow cavity; and
a joint in the first coupling.

26. The apparatus according to claim 25, wherein the joint is a swivel.

27. The apparatus according to claim 26, wherein the joint permits bending.

28. The apparatus according to claim 27, further comprising:
a dielectric fluid located within interstices of the dielectric rope.

29. The apparatus according to claim 28, further comprising:
a dielectric fluid located within the hollow cavity and surrounding the dielectric rope.

30. The apparatus according to claim 25, wherein the rope is connected to the first coupling.

* * * * *